United States Patent
Babitsky et al.

[11] 3,892,722
[45] July 1, 1975

[54] METHOD FOR PREPARING STEREOREGULAR 1,4-TRANSPOLYMERS OF 2-ALKYL- BUTADIENES-1,3 OR STEREOREGULAR 1,4-TRANSCOPOLYMERS OF 2-ALKYLBUTADIENES-1,3 WITH BUTADIENE-1,3

[76] Inventors: Boris Davidovich Babitsky, ulitsa Krasnogo Kursanta, 7, kv. 9; Vadim Nikolaevich Beresnev, ulitsa Pulkovskaya, 3, kv. 164; Tatyana Georgievna Bolshakova, ulitsa Lensoveta, 87, kv. 85; Natalya Anatolievna Buzina, prospekt Slavy, 16, kv. 129, all of Leningrad; Valentin Alexandrovich Vasiliev, ulitsa Gorskaya 13, Leningradskaya oblast; Nadezhda Andreevna Kalinicheva, ulitsa Zaitseva, 17/23, kv.26, Leningrad; Vitaly Abramovich Kormer, ulitsa Zheleznovodskaya, 62, kv. 2, Leningrad; Mark Iosifovich Zobach, prospekt Annikova, 28, kv. 52, Leningrad; Ivan Ignatievich Radchenko, Apraksin pereulok, 11, kv. 2, Leningrad; Taisiya Danilovna Khrustaleva, ulitsa Voskova, 16, kv. 26, Leningrad, all of U.S.S.R.

[22] Filed: June 15, 1973

[21] Appl. No.: 370,472

[52] U.S. Cl. .............................. 260/82.1; 260/94.3
[51] Int. Cl. .......................... C08d 1/18; C08d 3/08
[58] Field of Search ........................ 260/94.3, 82.1

[56] References Cited
UNITED STATES PATENTS

| | | |
|---|---|---|
| 3,468,866 | 9/1969 | Alferov et al. ................... 260/94.3 |
| 3,497,488 | 2/1970 | Dawans et al. .................. 260/94.3 |
| 3,660,445 | 5/1972 | Dawans et al. ................ 260/94.3 X |
| 3,719,653 | 3/1973 | Dawans et al. .................. 260/94.3 |

Primary Examiner—William F. Hamrock

[57] ABSTRACT

A method for preparing stereoregular 1,4-transpolymers of 2-alkylbutadienes-1,3 or stereoregular 1,4-transcopolymers of 2-alkylbutadienes-1,3 with butadiene-1,3 consisting in that 2-alkylbutadienes-1,3 are polymerized or 2-alkylbutadienes-1,3 are copolymerized with butadiene-1,3 in an aqueous medium in the presence of $\pi$-allyl complexes of nickel having the general formula

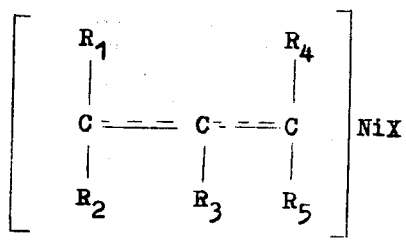

where $R_1$, $R_2$, $R_3$, $R_4$ and $R_5$ are hydrogen, alkyl, aryl, halide, or various combinations thereof, and X is a monovalent anion, with subsequent isolation of the main products from the reaction mixture.

The proposed method ensures the preparation of the above named polymers and coopolymers of 1,4-trans-stereoregular structure, which is responsible for their high elasticity and strength. The method is simple and efficient, since the polymerization and copolymerization processes are effected in an aqueous medium.

4 Claims, No Drawings

METHOD FOR PREPARING STEREOREGULAR 1,4-TRANSPOLYMERS OF 2-ALKYL-BUTADIENES-1,3 OR STEREOREGULAR 1,4-TRANSCOPOLYMERS OF 2-ALKYLBUTADIENES-1,3 WITH BUTADIENE-1,3

The invention relates to the methods for preparing stereoregular 1,4-transcopolymers of 2-alkylbutadienes-1,3 or stereoregular 1,4-trans-copolymers of 2-alkylbutadienes-1,3 with butadiene-1,3.

The said polymers and copolymers are used in medicine, tyre manufacture and some other branches of rubber industry, for example in the manufacture of glues, films, balls, conveyor belts, transmission belts, etc.

A method is known in the prior art by which stereoregular 1,4-transpolymers of 2-alkylbutadienes-1,3, for example, 2-methylbutadienes-1,3, or stereoregular 1,4-trans-copolymers of 2-alkylbutadienes-1,3 with butadiene-1,3 are produced by polymerization of 2-alkylbutadienes-1,3 or copolymerization of 2-alkylbutadienes-1,3 with butadiene-1,3 in a medium of hydrocarbons in the presence of Ziegler type catalysts on the basis of vanadium derivatives and aluminum-organic compounds.

Known also is the method for preparing polymers of 2-alkylbutadienes-1,3 or copolymers of 2-alkylbutadienes-1,3 with butadiene-1,3 of irregular structure by polymerization of 2-alkylbutadienes-1,3 or copolymerization of 2-alkylbutadienes-1,3 with butadiene-1,3 in an aqueous medium in the presence of initiating agents of the free-radical type, with subsequent isolation of the main products from the reaction mixture, for example, by precipitation with ethyl alcohol.

The disadvantage of the first method is the complexity of the process and low efficiency, which are due to the use of hydrocarbon medium in which the polymerization and copolymerization processes are carried out.

Unlike the first method, the other method is simpler with respect to the equipment used in the process, and the process itself is more efficient from the economic standpoint since it is carried out in an aqueous medium. The second method however, cannot be used to prepare polymers of 2-alkylbutadienes-1,3 and copolymers of 2-alkylbutadienes-1,3 with butadine-1,3 of 1,4-trans-stereoregular structure, whereas the regularity of the polymer chain structure is the prerequisite condition for preparing highly elastic polymers and copolymers (elastomers) possessing high strength.

The object of the invention is to work out a process for preparing polymers of 2-alkylbutadiene-1,3 or copolymers of 2-alkylbutadienes-1,3 with butadiene-1,3 which would permit accomplishing the process of polymerization of 2-alkylbutadienes-1,3 or copolymerization of 2-alkylbutadienes-1,3 with butadiene-1,3 in an aqueous medium to obtain the said products with 1,4-trans-stereoregular structure.

In accordance with this and the other objects the invention consists in that polymerization of 2-alkylbutadienes-1,3 or copolymerization of 2-alkylbutadienes-1,3 with butadiene-1,3 is effected in an aqueous medium with subsequent isolation of the main products from the reaction mixture. According to the invention, the said processes of polymerization and copolymerization are carried out in the presence of π-allyl complexes of nickel having the general formula

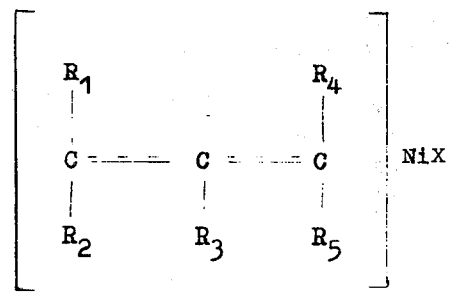

where $R_1$, $R_2$, $R_3$, $R_4$ and $R_5$ are hydrogen, alkyl, aryl, halide, or various combinations thereof, and X is a singly charged anion.

The above complexes perform the role of catalysts of the polymerization of 2-alkylbutadienes-1,3 and copolymerization of 2-alkylbutadienes-1,3 with butadiene-1,3. The ionic-coordination mechanism of action of these catalysts yields polymers and copolymers of 1,4-trans-stereoregular structure.

In order to intensify the activity of the π-allyl complexes of nickel, the process of polymerization or copolymerization of the said monomers should be carried out in the presence of co-catalyst, which may be the following substances:

a. saturated acids of the fatty series or their salts;
b. mineral acids or their salts.

With the aim of intensifying the efficiency of the polymerization and copolymerization processes, the said processes should be carried out in the presence of emulsifiers.

The proposed method for preparing stereoregular 1,4-transpolymers of 2-alkylbutadienes-1,3 and stereoregular 1,4-trans copolymers of 2-alkylbutadienes-1,3 with butadiene-1,3 is effected as follows.

A mixture of water, catalyst and monomers is first prepared. The π-allyl complexes of nickel, which are used as catalysts, have the above specified general formula, in which the substituents may be, for example, the following substances:

1. $R_1 - R_5 = H$, $X = CH_3COO$, or
2. $R_1 = CH_3$, $R_2 - R_5 = H$, $X = Cl$, or
3. $R_1 = R_5 = CH_3$, $R_2 = R_3 = R_4 = H$, $X = I$, or
4. $R_1 = C_6H_5$, $R_2 = R_4 = R_5 = H$, $R_3 = C_3H_7$, $X = CNS$, or
5. $R_1 = Cl$, $R_2 = R_3 = R_4 = H$, $R_5 = C_6H_5$, $X = RSO_3$, where $R = CH_3$, $C_2H_5$, $C_3H_7$, etc. or
6. $R_1 = R_2 = R_4 = H$, $R_3 = Br$, $R_5 = C_4H_9$, $X = RS$, where $R = CH_3$, $C_2H_5$ $C_3H_7$, etc.

The π-allyl complexes of nickel are active catalysts and can be used in the proposed method in various ratios with respect to the starting monomers. These complexes are active even in small quantities, for example, 0.1 mmole per 100 mmoles of monomers.

2-methylbutadiene-1,3 (isoprene), 2-ethylbutadiene-1,3, 2-n-propylbutadiene-1,3, 2-isopropylbutadiene-1,3 2-butylbutadiene-1,3, and others can be used in the proposed method as 2-alkylbutadienes-1,3.

The process of polymerization of 2-alkylbutadienes-1,3 or their copolymerization with butadiene-1,3 is effected within a wide in range of temperatures (from 5 to 100°C) with constant stirring. On the termination of the process, the main products are isolated from the reaction mixture, for example, by setting out with ethyl alcohol.

As has been stated above, in order to increase the activity of the catalyst, the processes of polymerization and copolymerization should be carried out in the presence of a co-catalyst. The following exemplary substances can be used as the co-catalyst:
a. saturated acids of the fatty series (formic, acetic, oxylic, adipic, etc), or their salts (sodium acetate, nickel trifluoroacetate, magnesium adipate, etc), or
b. mineral acids (hydrochloric, sulphuric, carbonic, nitric, hydrobromic, etc) or their salts (potassium thiocyanate, sodium bisulphate, tin chloride, ferric chloride, potassium iodide, etc).

Moreover, in order to improve the efficiency of the polymerization and copolymerization processes, they should preferably be carried out in the presence of emulsifying agents, such as, for example, polyethylene oxides, salts of sulphonic acids, etc.

The order, in which the above named components (catalyst, co-catalyst, monomers, emulsifying agents) are added to the reaction mixture is not important. But still the following sequence should preferably be observed in adding the components to the aqueous medium: catalyst-co-catalyst-monomers - emulsifying agents.

For a better understanding of the present invention the following examples of preparing stereoregular 1,4-transpolymers of 2-alkylbutadienes-1,3 and stereoregular 1,4-transcopolymers of 2-alkylbutadienes-1,3 with butadiene-1,3 are given by way of illustration.

EXAMPLE 1

Placed into an ampoule of 100 ml capacity were 20 ml of water, 0.25 mmole of pentenylnickel iodide and 100 mmoles of isoprene. The polymerization temperature was 50°C and the reaction mixture was continually stirred for 40 hours. The polymer was then precipitated from the reaction mixture by ethyl alcohol containing an additive of a stabilizing agent diphenyl paraphenylene diamine, and dried.

The resultant product was 2 g of polyisoprene (the yield 29 per cent) consisting of 94 per cent of 1,4-trans units and 6 per cent of 3,4-units (1,4-cis units and 1,2-units were absent).

EXAMPLE 2

The polymerization of isoprene was effected by the procedure similar to that described in Example 1, except that the co-catalyst was also present (0.75 mmole of potassium iodide). The synthesized polymer was isolated as described in Example 1.

The resultant product was 3 g of polyisoprene (the yield 45 per cent) consisting of 93 per cent of 1,4-transunits, 6 per cent of 3,4-units and 1 per cent of 1,2-units

EXAMPLE 3

The polymerization of isoprene was carried out in the presence of an emulsifying agent, namely oxyethylated alkylphenol (0.35 g). Otherwise the conditions for the polymerization and isolation of the resultant product were the same as described in Example 1.

The yield of polyisoprene was 39 per cent. The polymer contained 91 per cent of 1,4-units, 8 per cent of 3,4-units and less than 1 per cent of 1,2-units.

EXAMPLE 4

Introduced into an ampoule of 100 ml capacity were 20 ml of water, 0.25 mmole of pentenylnickel iodide, 0.75 mmole of potassium iodide, 100 mmole of isoprene and 0.35 g of oxyethylated alkylphenol. The polymerization temperature was 50°C and the process was continued for 40 hours with constant stirring.

The resultant product was 4.8 g of polyisoprene (the yield 71 per cent) containing 90 per cent of 1,4-trans units, 7 per cent of 3,4-units, 2 per cent of 1,4-cis units and less than 1 per cent of 1,2-units.

EXAMPLES 5–10

Placed into an ampoule of 100 ml capacity were 20 ml of water, 0.25 mmole of 1-n-butyl-2-bromo-allylnickelmercaptide, a co-catalyst, (the appearance of which and the quantity loaded are specified in the Table which follows below), 100 mmole of isoprene and 0.35 g of an emulsifying agent polyoxyethylensorbitane monopalmitate. The polymerization was carried out at a temperature of 5°C for 40 hours with constant stirring.

The yield of polyisoprene and the characteristics of its micro-structure, as well as the appearance and the quantity of the co-catalyst, are specified in the said Table.

Table

| Example Nos. | Co-Catalyst appearance | Co-Catalyst quantity, mmole | Polyisoprene yield % | Polyisoprene microstructure, (percentage composition) | | | |
|---|---|---|---|---|---|---|---|
| | | | | 1,4-trans | 1,4-cis | 3,4- | 1,2-units |
| 5 | KSNC | 0.75 | 55 | 89 | 6 | 5 | 0 |
| 6 | NaHSO$_4$ | 0.50 | 81 | 87 | 6 | 6 | 1 |
| 7 | CH$_3$COONa | 0.75 | 71 | 92 | 3 | 4 | 1 |
| 8 | GaCl$_3$ | 0.25 | 43 | 85 | 10 | 5 | 0 |
| 9 | SnCl$_4$ | 0.25 | 59 | 90 | 7 | 3 | 0 |
| 10 | FeCl$_3$ | 0.25 | 65 | 92 | 3 | 5 | 0 |

EXAMPLE 11

Placed into an ampoule of 100 ml capacity were 20 ml of water, 0.25 mmole of butylnickel iodide, 0.75 mmole of co-catalyst (oxalic acid), 100 mmole of isoprene and 0.35 g of emulsifying agent (oxyethylated alkylphenol). The polymerization was continued for 40 hours at a temperature of 30°C.

The yield of polyisoprene was 30 per cent. The polymer consisted of 92 per cent of 1,4-trans units, 4 per cent of 3,4-units, 3 per cent of 1,4-cis units and 1 per cent of 1,2 units.

EXAMPLE 12

Placed into an ampoule of 100 ml capacity were 20 ml of water, 0.25 mmole of 1-phenyl-2-isopropyl π-allylnickel thiocyanide, 0.75 mmole of co-catalyst (hydrochloric acid), 100 mmole of isoprene and 0.35 g of emulsifying agent (oxyethylated alkylphenol). The polymerization was carried out at a temperature of 100°C and constant stirring for 40 hours.

The yield of polyisoprene was 75 per cent. The polymer contained 93 per cent of 1,4-trans units, 6 per cent of 3,4 units and less than 1 per cent of 1,2-units.

EXAMPLE 13

Placed into an ampoule of 100 ml capacity were 20 ml of water, 0.25 mmole of allylnickel iodide, 100 mmole of 2-ethylbutadiene-1,3 and 0.35 g of emulsifying agent (polyoxyethylenesorbitane monopalmitate). The polymerization was carried out at a temperature of 50°C for 40 hours.

The yield of the polymer was 41 per cent. The polymer consisted of 85 per cent of 1,4-trans units, 14 per cent of 3,4-units and 1 per cent of 1,2-units.

EXAMPLE 14.

The polymerization of 2-isopropylbutadiene-1,3 was carried out in the conditions similar to those described in Example 13, except that the temperature was 5°C.

The polymerization was continued for 40 hours. The yield was 11 per cent. The polymer consisted of 74 per cent of 1,4-trans units, 22 per cent of 3,4-units and 4 per cent of 1,2-units.

EXAMPLE 15.

Placed into an ampoule of 100 ml capacity were 20 ml of water, 0.25 mmole of pentenylnickel chloride, 0.75 mmole of potassium iodide, 100 mmole of isoprene and 0.35 g of polyoxyethylenesorbitane monopalmitate. The polymerization was carried out at a temperature of 50°C for 16 hours.

The yield of the resulting polyisoprene was 10 per cent, and it consisted of 91 per cent of 1,4-trans units, 6 per cent of 3,4-units and 3 per cent of 1,4-cis units.

EXAMPLE 16

Into an ampoule of 100 ml capacity placed were 20 ml of water, 0.25 mmole of pentenylnickel iodide, 50 mmole of isoprene and 50 mmole of butadiene-1,3. The copolymerization was carried out at a temperature of 20°C for 40 hours.

The yield of the copolymer was 24 per cent. It consisted of 67 per cent of isoprene units, 93 per cent of which had the 1,4-trans structure, and 33 per cent of butadiene units, 91 per cent of which had the 1,4-trans structure.

EXAMPLE 17

Placed into an ampoule of 100 ml capacity placed were 20 ml of water, 0.25 mmole of pentenylnickel iodide, 0.75 mmole of acetic acid, 50 mmole of isoprene and 50 mmole of butadiene-1,3. The copolymerization was carried out at a temperature of 50°C for 40 hours.

The yield of the resultant copolymer was 41 per cent. The copolymer consisted of 64 per cent of isoprene units, 92 per cent of which had the 1,4-trans structure, and 36 per cent of butadiene units, 88 per cent of which had the 1,4-trans structure.

EXAMPLE 18

Placed into an ampoule of 100 ml capacity were 20 ml of water, 0.25 mmole of pentenylnickel iodide, 50 mmole of isoprene, 50 mmole of butadiene-1,3 and 0.35 g of emulsifying agent (oxyethylated alkylphenol). The copolymerization was carried out at a temperature of 50°C for 40 hours.

The yield of the copolymer in these conditions was 35 per cent. The copolymer consisted of 65 per cent of isoprene units, 92 per cent of which had the 1,4-trans structure, and 35 per cent of butadiene units, 89 per cent of which had the 1,4-trans structure.

EXAMPLE 19

Placed into an ampoule of 100 ml capacity were 20 ml of water, 0.25 mmole of pentenylnickel iodide, 0.75 mmole of potassium iodide, 50 mmole of 2-ethylbutadiene-1,3, 50 mmole of butadiene-1,3 and 0.35 g of oxyethylenated alkylphenol. The copolymerization was carried out at a temperature of 50°C for 40 hours.

The resultant copolymer (the yield 68 per cent) consisted of 40 per cent of 2-ethylbutadiene-1,3 units 85 per cent of which had the 1,4-trans structure, and 60 per cent of butadiene-1,3 units, 89 per cent of which had the 1,4-trans structure.

EXAMPLE 20

Placed into an ampoule of 100 ml capacity were 20 ml of water, 0.25 mmole of pentenylnickel iodide, 0.75 mmole of co-catalyst (formic acid), 50 mmole of isoprene, 50 mmole of butadiene-1,3 and 1 g of emulsifying agent (sodium dodecylsulphate). The copolymerization was carried out at a temperature of 50°C for 40 hours.

The yield of the copolymer was 63 per cent, and it consisted of 64 per cent of isoprene units, 88 per cent of which had the 1,4-trans structure, and 36 per cent of butadiene units, 92 per cent of which had the 1,4-trans structure.

EXAMPLE 21

Placed into an ampoule of 100 ml capacity were 20 ml of water, 0.25 mmole of allylnickel iodide, 0.75 mmole of potassium iodide, 50 mmole of 2-decylbutadiene-1,3, 50 mmole of butadiene-1,3 and 0.35 g of oxyethylated alkylphenol. The copolymerization was continued for 40 hours at a temperature of 50°C.

The yield of the copolymer was 59 per cent and it consisted of 54 per cent of 2-decylbutadiene-1,3 units, 93 per cent of which had the 1,4-trans structure, and 46 per cent of butadiene-1,3 units, 91 per cent of which had the 1,4-trans structure.

EXAMPLE 22

Placed into an ampoule of 100 ml capacity were 20 ml of water, 0.75 mmole of crotylnickel iodide, 1.5 mmole of oxalic acid, 30 mmole of 2-n-propylbutadiene-1,3 and 70 mmole of butadiene-1,3. The copolymerization was continued for 16 hours at a temperature of 80°C.

The yield of the copolymer was 79 per cent, and it consisted of 24 per cent of propylbutadiene units, 95 per cent of which had the 1,4-trans structure, and 76 per cent of butadiene units, 90 per cent of which had the 1,4-trans structure.

EXAMPLE 23

Placed into an ampoule of 100 ml capacity were 20 ml of water, 0.1 mmole of pentenylnickel iodide, 0.3 mmole of adipic acid, 80 mmole of 2-isopropylbutadiene-1,3 and 20 mmole of butadiene-1,3. The copolymerization was continued for 40 hours at a temperature of 100°C.

The yield of the copolymer was 43 per cent, and it consisted of 63 per cent of isopropylbutadiene units, 97 per cent of which had the 1,4-trans structure, and 37 per cent of butadiene units, 94 per cent of which had the 1,4-trans structure.

We claim:
1. A method for preparing polymers selected from the group consisting of stereoregular 1,4-trans-polymers of 2-alkylbutadienes-1,3 and stereoregular 1,4-trans copolymers of 2-alkylbutadienes-1,3 with butadiene-1,3, consisting essentially of polymerizing monomers selected from the group consisting of 2-alkylbutadienes-1,3 and mixtures of 2-alkylbutadienes-1,3 with butadiene-1,3 in an aqueous medium in the presence of π-allyl complexes of nickel having the formula

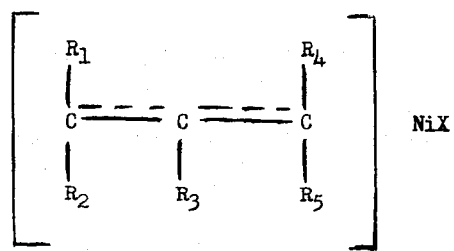

where $R_1$, $R_2$, $R_3$, $R_4$ and $R_5$ are each selected from the group consisting of hydrogen, alkyl, aryl, and halide, and X is a singly charged anion, and subsequently isolating the main products from the reaction mixture.

2. A method according to claim 1, in which said monomers are polymerized in the presence of a co-catalyst selected from the group consisting of saturated acids of the fatty series, and salts of these acids.

3. A method according to claim 1, in which said monomers are polymerized in the presence of emulsifying agents.

4. A method according to claim 2, in which said monomers are polymerized in the presence of emulsifying agents.

* * * * *